(12) United States Patent
White et al.

(10) Patent No.: US 6,184,164 B1
(45) Date of Patent: Feb. 6, 2001

(54) BIMODAL SILICON NITRIDE-BAS CERAMIC COMPOSITES

(75) Inventors: Kenneth W. White, Kemah; Feng Yu, Houston, both of TX (US)

(73) Assignee: The University of Houston, Houston, TX (US)

( * ) Notice: Under 35 U.S.C. 154(b), the term of this patent shall be extended for 0 days.

(21) Appl. No.: 09/301,531

(22) Filed: Apr. 28, 1999

(51) Int. Cl.$^7$ .............................. C03C 14/00; C04B 35/81
(52) U.S. Cl. ................... 501/32; 501/8; 501/95.3; 501/97.4
(58) Field of Search .................. 501/8, 32, 95.3, 501/97.4, 97.3

(56) References Cited

U.S. PATENT DOCUMENTS

| | | | |
|---|---|---|---|
| 5,358,912 | 10/1994 | Freitag et al. | 501/97 |
| 5,538,925 | 7/1996 | Talmy et al. | 501/8 |
| 5,578,534 | * 11/1996 | Talmy et al. | 501/32 |
| 5,585,314 | 12/1996 | Ezis et al. | 501/92 |
| 5,723,392 | 3/1998 | Ezis et al. | 501/92 |

OTHER PUBLICATIONS

Drummond, C.H., III, "Glass–Formation and Crystallization in High–Temperature Glass–Ceramics and $Si_3N_4$", Journal of Non–Cyrstalline Solids, vol. 123, 114–128 (1990).

Pickup, H. and Brook, R.J., "Barium Oxide as a Sintering Aid for Silicon Nitride", British Ceramic Society Proceedings, vol. 39, 69–76 (1987).

Richardson, Kerry K., Freitag and Doug W., Hunn, David L., "Barium Aluminosilicate Reinforced In Situ with Silicon Nitride", Journal of American Ceramic Society, vol. 78[10], 2662–68 (1995).

Hwang, C.J. and Newman, R.A., "Silicon Nitride Ceramics With Celsian as an Additive", Journal of Materials Science, vol. 31, 150–156 (1996).

* cited by examiner

*Primary Examiner*—Karl Group
(74) *Attorney, Agent, or Firm*—Tim Headley; Haynes and Boone, LLP

(57) ABSTRACT

A composition and method of fabricating pressureless sintered 70 volume % silicon nitride-30 volume % barium aluminum silicate ceramic composites. The composites are made from 70 volume % silicon nitride, containing varying amounts and size distributions of initial β-silicon nitride, and 30 volume % barium aluminum silicate. The resulting ceramic composites contain microstructures with coarse β-silicon nitride whiskers, as well as narrow distributions of short β-silicon nitride whiskers, surrounded by fine barium aluminum silicate grains. The resulting composites exhibit improved fracture toughness and flexural strength.

8 Claims, 3 Drawing Sheets

BIMODAL SILICON NITRIDE-BAS CERAMIC COMPOSITES

TECHNICAL FIELD

This invention relates to the field of high temperature strength ceramics, and, more particularly, to pressureless sintered silicon nitride ($Si_3N_4$)-barium aluminosilicate (BAS) ceramic composites.

BACKGROUND OF THE INVENTION

Silicon nitride ceramics are particularly useful for applications that require high temperature strength and thermal shock resistance. Previously, high pressure methods were used to fabricate these ceramics. However, the use of high pressures often increased manufacturing costs and limited the geometric shape of the formed component. In order to overcome these barriers, researchers developed the technique of pressureless sintering.

Using pressureless sintering techniques, researchers have been able to fabricate $Si_3N_4$-BAS ceramic composites with high strength and some levels of damage tolerance. However, the industry needs further improvements in fracture toughness and flexural strength before pressureless sintered $Si_3N_4$-BAS ceramic composites can rival $Si_3N_4$-BAS composites fabricated using high pressure techniques.

At present time, researchers have been unable to fabricate pressureless sintered $Si_3N_4$-BAS composites that exhibit both increased flexural strength and fracture toughness. Experimentation has shown that $Si_3N_4$-BAS composites with relatively uniform microstructures, consisting of β whiskers of several microns in length, usually exhibit high flexural strength and little or no R-curve behavior. Further, experimentation has also shown that $Si_3N_4$-BAS composites with microstructures consisting of β whiskers with increased diameters usually exhibit high fracture toughness and rising R-curves. Based on these observations, researchers hypothesized that a $Si_3N_4$-BAS composite with optimum distributions of coarse β-$Si_3N_4$ whiskers, surrounded by a matrix of short β-$Si_3N_4$ whiskers and fine BAS grains, or a bimodal microstructure, would provide an ideal compromise between toughness and strength.

Therefore, what is needed is a composition and a method to fabricate pressureless sintered $Si_3N_4$-BAS ceramic composites, with optimum distributions of coarse β-$Si_3N_4$ whiskers, surrounded by a matrix of short β-$Si_3N_4$ whiskers and fine BAS grains, that exhibit improved fracture toughness and flexural strength.

SUMMARY OF THE INVENTION

The present invention provides for a composition and method of fabricating pressureless sintered 70 volume % $Si_3N_4$-30 volume % BAS ceramic composites. The composites are made from 70 volume % $Si_3N_4$, containing varying amounts and size distributions of initial $Si_3N_4$, and 30 volume % BAS. The resulting ceramic composites contain microstructures with coarse β-$Si_3N_4$ whiskers, as well as narrow distributions of short β-$Si_3N_4$ whiskers, surrounded by fine BAS grains.

An advantage is achieved with the present invention in that it enables the fabrication of 70 volume % $Si_3N_4$-30 volume % BAS ceramic composites with bimodal microstructures. Another advantage achieved with the present invention is that the composites exhibit improved fracture toughness and flexural strength.

DETAILED DESCRIPTION OF THE PREFERRED EMBODIMENT

Figure 1:
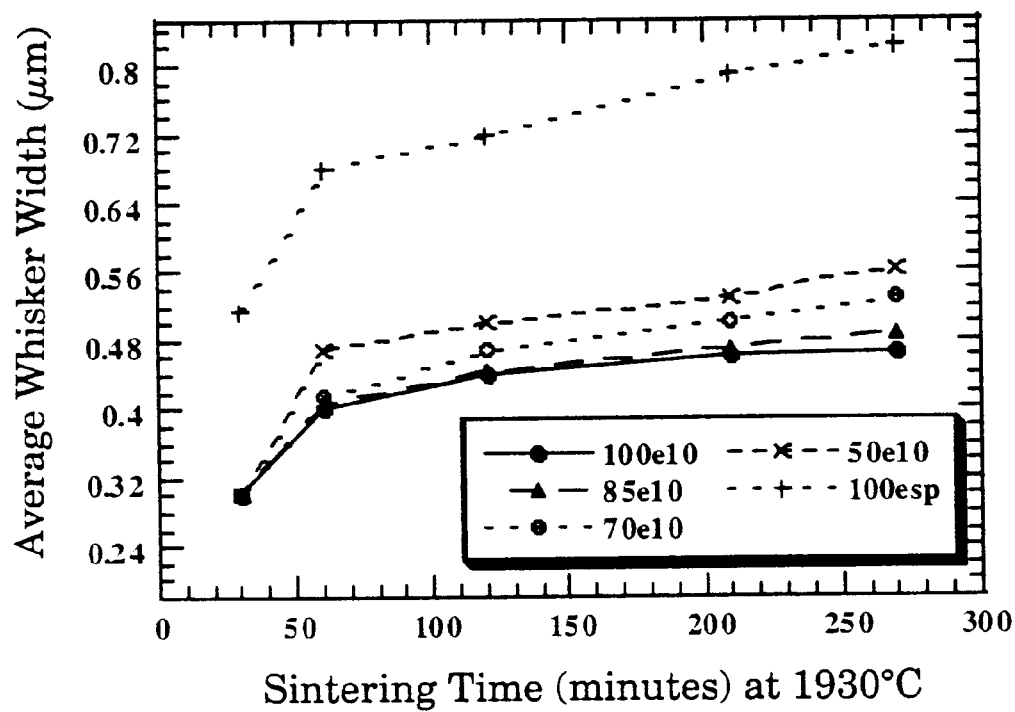
FIG. 1 is a graph comparing sintering time with average whisker width.

The present invention provides for pressureless sintered 70 volume % $Si_3N_4$-30 volume % BAS ceramic composites that contain 100 volume % β-$Si_3N_4$ whiskers of varying lengths and diameters. These composites exhibit improved fracture toughness and flexural strength. Preferred embodiments of the present invention contain a bimodal microstructure. Namely, a microstructure with coarse β-$Si_3N_4$ whiskers, as well as narrow distributions of short β-$Si_3N_4$ whiskers, surrounded by a fine matrix of BAS.

The present invention also provides for a method of fabricating 70 volume % $Si_3N_4$-30 volume % BAS ceramic composites with a bimodal microstructure. According to the present invention, a ceramic composite manufacturer can make 70 volume % $Si_3N_4$-30 volume % BAS ceramic composites by first blending 70 volume % $Si_3N_4$ powder, of which approximately 3–6 volume % is β-$Si_3N_4$ and approximately 94–97 volume % is α-$Si_3N_4$, with 30 volume % BAS constituent powders into a homogeneous mixture. Preferably, the manufacturer should use two different $Si_3N_4$ starting powders, each having a different average particle sizes, β-$Si_3N_4$ crystallite diameters, and β-$Si_3N_4$ content by volume percent. After mixing the components, the manufacturer should then compact the mixture, and sinter the mixture at a temperature between 1850° C.–1980° C., in nitrogen. Preferably, the manufacturer should sinter the mixture for between 5–360 minutes.

EXAMPLES

Characterization of Silicon Nitride Powders

The inventors used UBE-E10 and UBE-ESP (UBE Industries America, Inc.) as the source of silicon nitride in the present invention. The inventors characterized the two silicon nitride powders using various techniques.

The inventors performed phase characterization by X-ray diffraction on the silicon nitride powders using a Siemens Diffrac-5000 X-ray diffractometer with Ni filtered $CuK_a$ radiation. The inventors used about 3 grams of powder for each analysis. The inventors determined a peak breadth (B(2q)) by measuring the half maximum intensity breadth of the (201) peak (2q=30.992°) of α-$Si_3N_4$ phase from the XRD spectrum. The inventors estimated the average particle size according to the Scherrer equation. The inventors evaluated the average β particle size using the (101) reflection of β-$Si_3N_4$.

The inventors also observed the particle morphology of the silicon nitride powders in a JEM-2000FX transmission electron microscope fitted with an energy dispersive X-ray spectrometer (EDS). The inventors estimated the average particle size from measurements made on the TEM micrographs.

Additionally, the inventors used sedimentation techniques to determine the particle size distribution of the $Si_3N_4$ powders. Particularly, the inventors dispersed the $Si_3N_4$ powders in Micromeritics A-11 dispersing fluid by sonicating the mixture for 30 seconds with an ultrasonic probe. The inventors then used a Micromeritics Sedigraph 5000ET to monitor the particle size distribution.

The $Si_3N_4$ powders had the following properties, as shown in Table 1:

TABLE 1

| Powder | Average particle size (From TEM) ($\mu$m) | Average $\alpha$-Si$_3$N$_4$ particle size (From XRD) ($\mu$m) | SSA* (m$^2$/g) | $\beta$-Si$_3$N$_4$ content (volume %) | $\beta$-Si$_3$N$_4$ crystallite diameter ($\mu$m) | Oxygen content* (wt %) |
|---|---|---|---|---|---|---|
| E10 | 0.17 | 0.29 | 11.1 | 5.76 | 0.31 | 1.26 |
| ESP | 0.35 | 0.50 | 6.5 | 3.65 | 0.53 | 1.08 |

*provided by the UBE company

As Table 1 demonstrates, the UBE-ESP Si$_3$N$_4$ powder (ESP) had less initial $\beta$ content than the UBE-E10 Si$_3$N$_4$ powder (E10). The ESP powder also had a wider particle-size distribution and larger average particle size.

Composite Fabrication

The inventors mixed 30 volume % BAS constituent powders (BaCO$_3$, AR Grade, Mallinckrodt Inc., Paris, Ky.; SM8 Al$_2$O$_3$, Baikowski International Corp., Charlott, N.C.; 2034DI SiO$_2$, Nyacol Products Inc., Ashland, Wash.) with 70 volume % Si$_3$N$_4$ powders that were prepared by mixing E10 and ESP in ratios of 100:0 (100E10), 85:15 (85E10), 70:30 (70E10), 50:50 (50E10) and 0:100 (100ESP), in iso-propyl alcohol for 48 hours in a ball mill using silicon nitride grinding media. The inventors used different ratios of the two different Si$_3$N$_4$ powders in order to vary the size distribution and initial $\beta$ content of the Si$_3$N$_4$ starting powders. Following mixing, the inventors then compacted the samples at a pressure of 50 MPa, and then packed the samples in graphite crucibles with a silicon nitride based powder bed. The inventors then sintered the samples at 1930° C. for 5, 30, 60, 120, 210, and 270 minutes in nitrogen.

Characterization of Composites

The inventors determined the flexural strength of the composites processed under each condition using three-point bending techniques, at room temperature and in lab air. The inventors cut the specimens used for the three-point bending tests from as-sintered pellets in dimensions of 3 mm×1.5 mm×30 mm, and ground the surface of the specimens using a 400-grit diamond wheel.

The inventors then used the indentation method to estimate the critical fracture toughness of the spent flexural strength testing bars. The inventors estimated fracture toughness in ambient air, using an Instron Universal Testing machine fitted with a diamond pyramid indenter. The contact loads varied from 40 to 55 kg, and the peak-load contact time was 90 seconds. The inventors used at least 12 valid impressions on each selected sample to estimate the fracture toughness according to the Anstis approach. The inventors measured a Young's module of 242 GPa by ultrasonic methods.

The inventors applied the plasma etching method to polished as-sintered samples to reveal the morphology of both the Si$_3$N$_4$ whiskers and BAS matrix. The inventors examined the whisker morphology by scanning electronic microscopy (SEM) methods. The inventors performed quantitative microstructural evaluation on SEM micrographs, where the diameter, length, and area of each grain were determined through commercially available image analysis software (NIH Image, National Institute of Health, USA).

This method defines the grain length and diameter as the maximum and minimum grain projection, respectively, and requires a statistically sufficient database. The inventors characterized at least 700 whiskers for each processing condition.

Referring to FIG. 1, the average whisker width of all the samples rapidly increases during initial sintering (between 30 and 60 minutes) at 1930° C. Upon further sintering, the average whisker width continues to steadily increase with sintering time. The 100E10 sample exhibits minimum coarsening, while the 100ESP sample exhibits maximum coarsening. The average whisker width of the 50E10 sample almost doubles when sintering time is extended from 30 minutes to 270 minutes.

Figure 2:
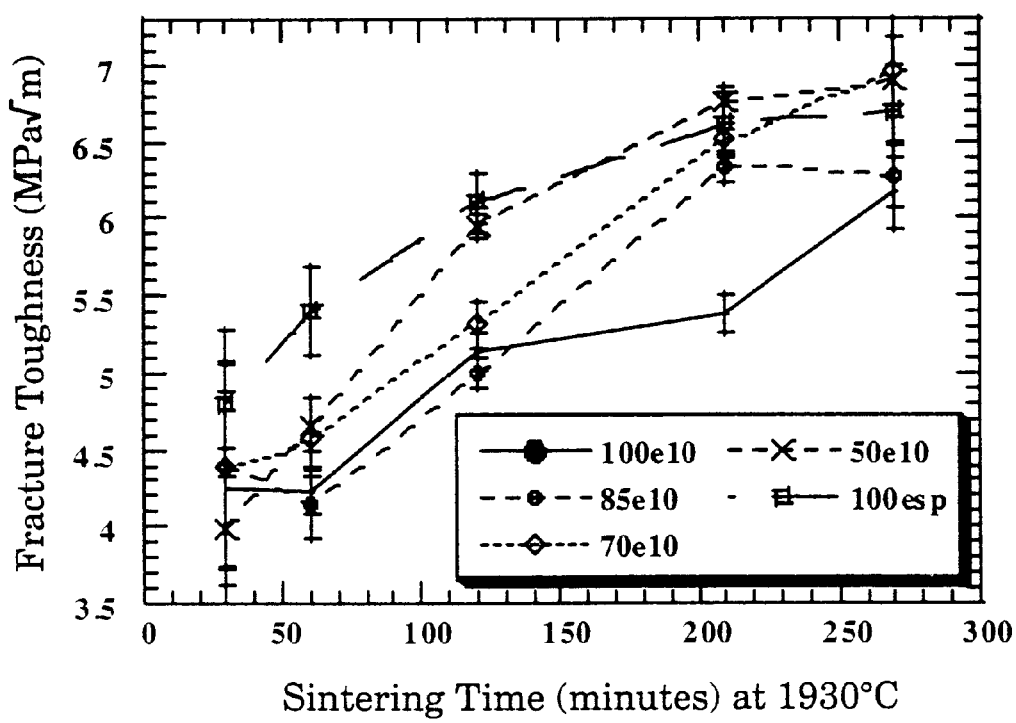
FIG. 2 is a graph comparing sintering time with fracture toughness.

Referring to FIG. 2, the fracture toughness ($K_{IC}$) of all the samples increases considerably with sintering time at 1930° C. The increase in fracture toughness with sintering time varies significantly from sample to sample. After sintering at 1930° C. for 270 minutes, the 70E10 sample has the highest fracture toughness, while the 100E10 sample has the lowest fracture toughness.

Figure 3:
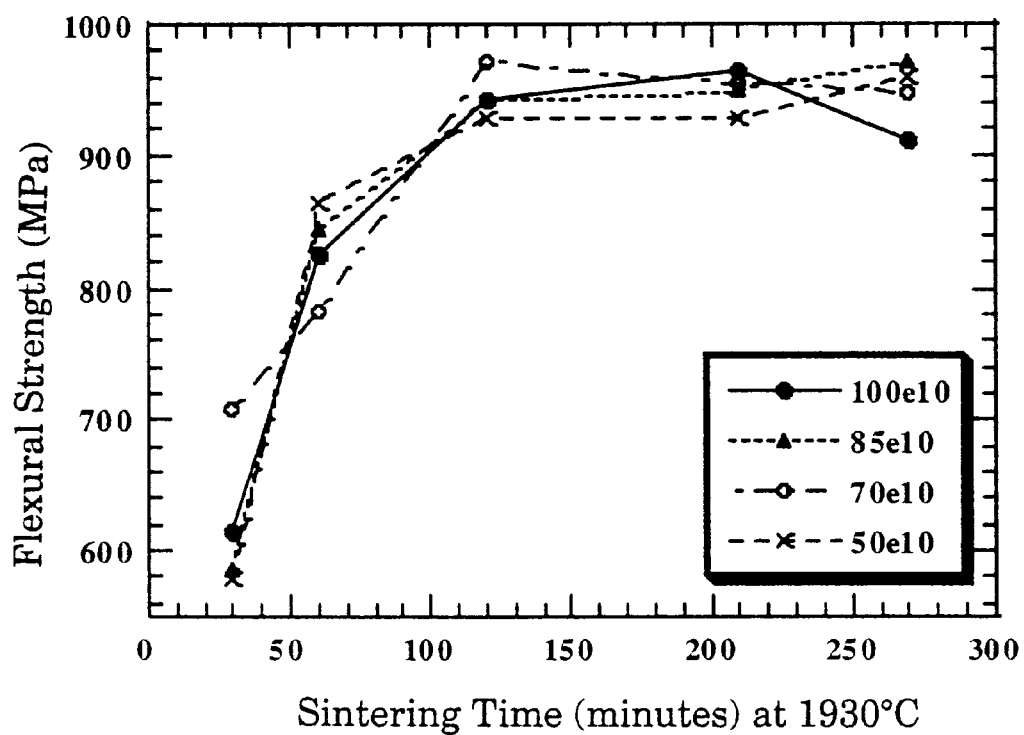
FIG. 3 is a graph comparing sintering time with flexural strength.

Referring to FIG. 3, all the samples demonstrate similar flexural strength behavior with increasing sintering time at 1930° C. The differences in microstructure within each sample do not appear to significantly affect flexural strength.

The inventors determined the relationship between whisker diameter and fracture toughness, as shown in Table 2 (samples sintered at 1930° C. for 210 minutes):

TABLE 2

| | Frequency (area %) (<0.5 $\mu$m) | Frequency (area %) (0.5–1 $\mu$m) | Frequency (area %) (1–1.5 $\mu$m) | Frequency (area %) (>1.5 $\mu$m) | $K_{IC}$ (MPa√m) |
|---|---|---|---|---|---|
| 100E10 | 32.6 | 64.9 | 2.5 | 0.0 | 5.4 |
| 85E10 | 22.8 | 69.2 | 8.0 | 0.0 | 6.3 |
| 70E10 | 23.1 | 66.9 | 9.4 | 0.5 | 6.5 |
| 50E10 | 12.9 | 69.0 | 14.1 | 4.1 | 6.8 |
| 100ESP | 22.1 | 61.0 | 4.5 | 12.4 | 6.6 |

As Table 2 demonstrates, all the samples contain similar populations of fine whiskers with diameters between 0.5–1 $\mu$m. Fracture toughness increases significantly with the initial population increase of course whiskers (diameters>1 $\mu$m), and then reaches a plateau with the further increase of coarse whiskers (diameters>1.5 $\mu$m), as sample 100ESP shows.

The inventors determined the relationship between whisker length and fracture toughness, as shown in Table 3 (samples sintered at 1930° C. for 210 minutes):

TABLE 3

| | Frequency (area %) (<5 $\mu$m) | Frequency (area %) (5–8 $\mu$m) | Frequency (area %) (8–10 $\mu$m) | Frequency (area %) (10–16 $\mu$m) | Frequency (area %) (>16 $\mu$m) | $K_{IC}$ (MPa√m) |
|---|---|---|---|---|---|---|
| 100E10 | 8.1 | 52.3 | 30.3 | 9.4 | 0.0 | 5.4 |
| 85E10 | 5.7 | 36.9 | 32.9 | 24.5 | 0.0 | 6.3 |
| 70E10 | 7.0 | 37.6 | 30.8 | 19.5 | 5.1 | 6.5 |
| 50E10 | 2.2 | 24.0 | 32.8 | 37.0 | 4.1 | 6.8 |
| 100ESP | 10.6 | 41.5 | 14.8 | 17.8 | 15.4 | 6.6 |

As Table 3 illustrates, fracture toughness generally increases with increased populations of long whiskers (lengths>10 $\mu$m). However, as sample 100ESP shows, higher population of longer whiskers (lengths>16 μm) tend to contribute less to improvements in fracture toughness.

The inventors determined the flexural strength and fracture toughness of the composites, as shown in Table 4 (samples sintered at 1930° C. for 210 minutes):

TABLE 4

|  | 100E10 | 85E10 | 70E10 | 50E10 | 100ESP |
|---|---|---|---|---|---|
| Flexural Strength (MPa) at 21° C. | 963.2 ± 103.0 | 948.6 ± 109.4 | 955.0 ± 94.3 | 929.0 ± 81.6 | 805.0 ± 93.0 |
| Fracture Toughness (MPa√m) at 21° C. | 5.4 ± 0.1 | 6.3 ± 0.1 | 6.5 ± 0.1 | 6.8 ± 0.1 | 6.6 ± 0.2 |

As Table 4 reflects, all the samples exhibit similar flexural strengths, except for the 100ESP sample. The 100ESP sample exhibits a drastically reduced flexural strength. As Table 4 also reflects, increases in fracture toughness generally correlate with increased concentrations of ESP, except with respect to the 100ESP sample.

Accordingly, highly preferred embodiments of the present invention include composites containing E10 and ESP in ratios of 70:30 and 50:50, respectively. These highly preferred embodiments contain bimodal microstructures, which likely contribute to the composites' enhanced fracture toughness and flexural strength.

What is claimed is:

1. A composition of matter, comprising:
   a. 70 volume % of $Si_3N_4$ of which 100 volume % is β-$Si_3N_4$ whiskers of varying lengths and diameters; and
   b. 30 volume % of barium aluminum silicate,
wherein the composition is a pressureless sintered ceramic composite.

2. The composition of claim 1, having a bimodal microstructure.

3. The composition of claim 2, having between 56–83 area % β-$Si_3N_4$ whiskers that are between 5–10 μm in length.

4. The composition of claim 3, having between 9–42 area % β-$Si_3N_4$ whiskers that are greater than 10 μm in length.

5. The composition of claim 4, having between 60–70 area % β-$Si_3N_4$ whiskers that are between 0.5–1 μm in diameter.

6. The composition of claim 5, having between 8–19 area % β-$Si_3N_4$ whiskers that are greater than 1 μm in diameter.

7. The composition of claim 6, having a room temperature flexural strength between 848–1066 Mpa.

8. The composition of claim 7, having a room temperature fracture toughness between 5.2–6.9 MpaVm, as measured by the Anstis method.

* * * * *